(12) United States Patent
Mori et al.

(10) Patent No.: US 6,212,159 B1
(45) Date of Patent: *Apr. 3, 2001

(54) LAMINATED OPTICAL DISC AND TURNTABLE FOR THE LAMINATED OPTICAL DISC

(75) Inventors: Kazuo Mori; Kimihide Nakatsu; Kiyoshi Yanagiguchi; Tetsuro Nagami; Kenjiro Kime; Yoshinobu Ishida, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,074

(22) Filed: Mar. 1, 2000

Related U.S. Application Data (62) Division of application No. 09/089,395, filed on Jun. 3, 1998, now Pat. No. 6,049,522, which is a division of application No. 08/863,620, filed on May 27, 1997, now Pat. No. 5,889,757.

(30) Foreign Application Priority Data

May 27, 1996 (JP) .................................................. 8-132017

(51) Int. Cl.[7] ....................................................... G11B 7/24
(52) U.S. Cl. ............................................ 369/282; 369/286
(58) Field of Search .................................... 369/272, 284, 369/283, 282, 286, 275.1–275.5; 360/133, 135

(56) References Cited

U.S. PATENT DOCUMENTS

| | | | |
|---|---|---|---|
| 4,555,716 | * 11/1985 | Odawara et al. | 346/137 |
| 5,681,634 | * 10/1997 | Miyamoto et al. | 428/64.6 |
| 5,728,250 | * 3/1998 | Kakinuma | 156/275.7 |
| 5,744,193 | * 4/1998 | Kitano | 427/162 |
| 5,956,317 | * 9/1999 | Komiyama et al. | 369/286 |
| 6,049,522 | * 4/2000 | Mori et al. | 369/282 |

FOREIGN PATENT DOCUMENTS

| | | |
|---|---|---|
| 0 814 470A2 | * 12/1997 | (EP) . |
| 60-28046 | 2/1985 | (JP) . |
| 60-103635 | 6/1985 | (JP) . |
| 61-214156 | * 9/1986 | (JP) . |
| 61-296546 | 12/1986 | (JP) . |
| 648526A | 1/1989 | (JP) . |
| 2-208839 | * 8/1990 | (JP) . |
| 2260272 | 10/1990 | (JP) . |
| 2-282941 | * 11/1990 | (JP) . |
| 2304736 | 12/1990 | (JP) . |
| 5314474 | 11/1993 | (JP) . |
| 87425 | 1/1996 | (JP) . |
| 8-315430 | * 11/1996 | (JP) . |
| 9-063124 | * 3/1997 | (JP) . |
| 9-293279 | * 11/1997 | (JP) . |
| 10-092015 | * 4/1998 | (JP) . |
| 10-149580 | * 6/1998 | (JP) . |

* cited by examiner

Primary Examiner—William Klimowicz (57) ABSTRACT

A turntable is a table mounted to a shaft (4) of a spindle motor and the turntable supports a laminated disc thereon and drives the disc in rotation. The laminated disc includes a lower disc and an upper disc stacked on the lower disc, and is supported on a disc-supporting surface. When the disc is loaded on the turntable, a fitting member fits into the center hole of the laminated disc for centering the laminated disc with respect to the shaft. The fitting member fits the center hole of the lower disc when the laminated disc is supported on said disc-supporting surface. The turntable may include a tapered member which guides the laminated disc to the disc-supporting surface. The laminated disc includes lower and upper discs each having an edge which defines the center hole. The corners of the edges are cut away along a circumference of the center hole. The upper and lower discs are placed together so that the cut-away corner directly face each other.

8 Claims, 11 Drawing Sheets

LAMINATED OPTICAL DISC AND TURNTABLE FOR THE LAMINATED OPTICAL DISC

This application is a divisional of application Ser. No. 09/089,395, filed on Jun. 3, 1998, now U.S. Pat. No. 6,049,522, which is a Div. of Ser. No. 08/863,620 filed May 27, 1997, now U.S. Pat. No. 5,889,757, the entire contents of which are hereby incorporated by reference.

BACKGROUND OF THE INVENTION

1. Technical Field of the Invention

The present invention relates to a laminated disc such as a DVD (Digital Video Disc) and a turntable on which laminated disc Is placed for reproduction of information.

2. Description of Prior Art

Figure 20:
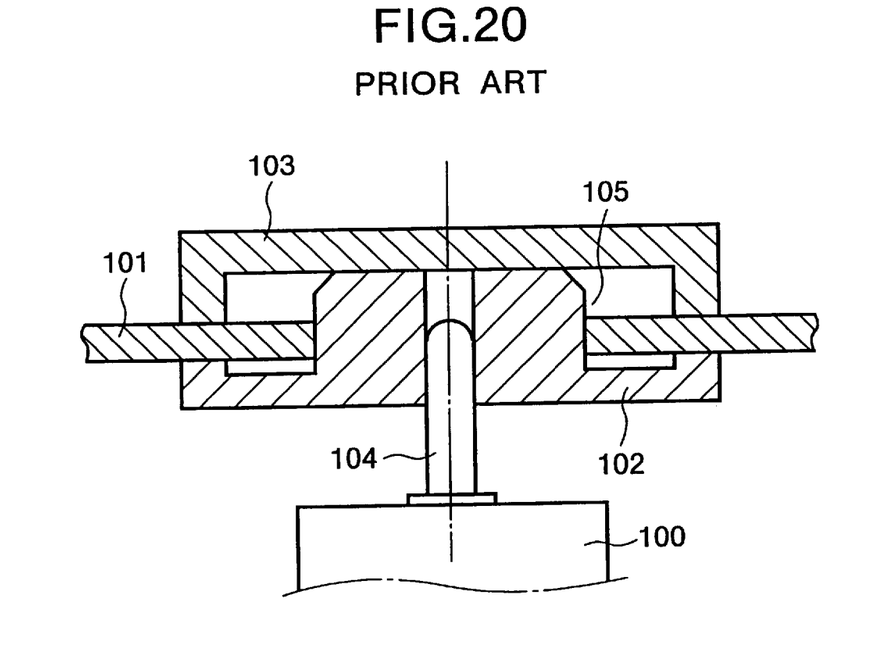
FIG. 20 is a cross-section view of a prior art turntable.

FIG. 20 is a cross-sectional view of a prior art turntable which is disclosed in Japanese Patent Preliminary Publication No. 8-7425. A turntable 102 has a hub 105 into which a motor shaft 104 is press-fitted or securely bonded to drive the turntable 102 in rotation. A disc 101 is placed on the turntable 102 and clamped by a clamper 103 so that the disc 101 is firmly held between the turntable 102 and the clamper 103 in a sandwiched relation. The hub 105 fits into a center hole 106 in the disc 101 with a very small clearance, thereby concentrically positioning the disc 101 with respect to the rotational axis of the motor shaft 104. The disc 101 is rotated by a driving force of a spindle motor 100.

Figure 21:
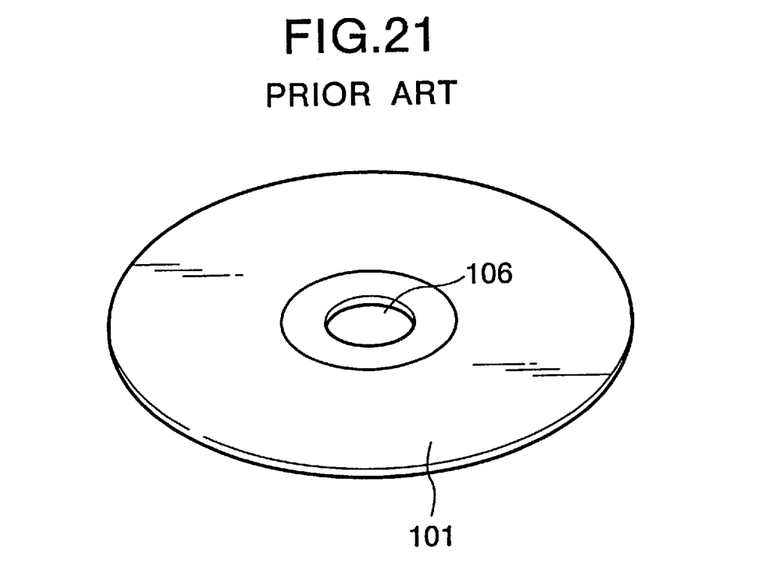
FIG. 21 is a perspective view of a conventional disc on which information is recorded.

FIG. 21 is a perspective view of a conventional disc 101 on which information is recorded. The disc 101 has a center hole 106 in its center and placed on the turntable 102.

A DVD is a laminated disc which includes two discs bonded together back-to-back. When the two discs are bonded together, they are placed one over the other slightly eccentric due to alignment error. This alignment error varies within a predetermined tolerance and results in a small step in the wall of the center hole of the discs.

When a DVD is loaded onto the aforementioned conventional turntable, the stepped wall of the center hole of the disc may be caught by the hub 105 so that the disc 101 will not descend to the supporting surface of the turntable.

A DVD is usually loaded onto the positioning hub of the turntable so that the hub extends through the center hole with a very small clearance between the DVD. Burrs projecting from the the bonded interface of the disc into the center hole also cause a problem similar to that caused by the stepped wall or may present a problem that the disc is not concentric with the positioning hub. A further problem with the conventional disc is that the bonding agent spreads from between the two discs into the center hole during the manufacture of the disc or during operation of the turntable at elevated temperatures.

SUMMARY OF THE INVENTION

The present invention was made in view of the aforementioned problems.

An object of the invention is to provide a turntable which allows a disc to be smoothly loaded without burrs or a step in the wall of the center hole caught by the positioning hub.

Another object of the invention is to provide a laminated disc which can be loaded onto a turntable without the step and burrs of the wall of the center hole of the disc caught by the hub and can be adjusted to be concentric with the positioning hub upon loading.

Still another object of the invention is to provide a laminated disc which prevents the bonding agent from spreading into the center hole from the bonded interface when the disc is manufactured or operated at elevated temperatures.

A turntable is a table which is mounted to a shaft of a spindle motor and supports a laminated disc thereon so as to drive the disc in rotation. The laminated disc includes a lower disc and an upper disc bonded on the lower disc, and is supported on a disc-supporting surface of the turntable. When the disc is loaded on the turntable, a fitting member of the turntable fits into the center hole of the laminated disc for centering the laminated disc with respect to the shaft. The fitting member fits the center hole of the lower disc when the laminated disc is supported on the disc-supporting surface.

The turntable may include a tapered member in the form of a truncated circular cone which is continuous with the fitting member and guides a laminated disc to the disc-supporting surface. The tapered member has a surface at an angle ($\theta$) with the shaft of the spindle motor. The surface meets three conditions expressed by, Condition I: $\tan \theta > d1/(m1-m2)$ which defines a maximum center-to-center distance d1 between the disc and the shaft;

Condition II: $\tan \theta \geq \{(n1-n2)/n3\}$ which defines a lower limit of $\theta$ so that the tapered member is prevented from interfering the laminated disc when the laminated disc is loaded onto the turntable; and Condition III: $\tan \theta < 1/\mu$ which defines an upper limit of the angle ($\theta$) of the tapered member;
where
  $\theta$ is the angle ($\theta$) which the tapered surface of the tapered member makes with the shaft;
  d1 is a center-to-center distance between the disc and the shaft;
  m1 is a distance between the disc-supporting surface and an upper end of the tapered surface of the tapered member;
  m2 is the distance between the disc-supporting surface and a lower end of the tapered surface of the tapered member;
  n1 is a center-to-center distance between the upper and lower discs of the laminated disc;
  n2 is a clearance between the laminated disc and the fitting member;
  n3 is a difference between the distance m2 and a thickness of the lower disc; and
  $\mu$ is a coefficient of friction between the laminated disc 11 and a surface 15a of the tapered member.

The laminated disc includes lower and upper discs, each having an inner edge which defines the center hole of the disc. The corners of the edges are cut away along the circumference of the center hole. The upper and lower discs are placed together in such a way that the cut-away corners of the upper and lower discs face each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of-the present invention, and wherein.

DETAILED DESCRIPTION OF THE PREFERRED EMBODIMENTS

Preferred embodiments of the present invention will be described in detail with reference to the drawings.

First Embodiment

Figure 1:
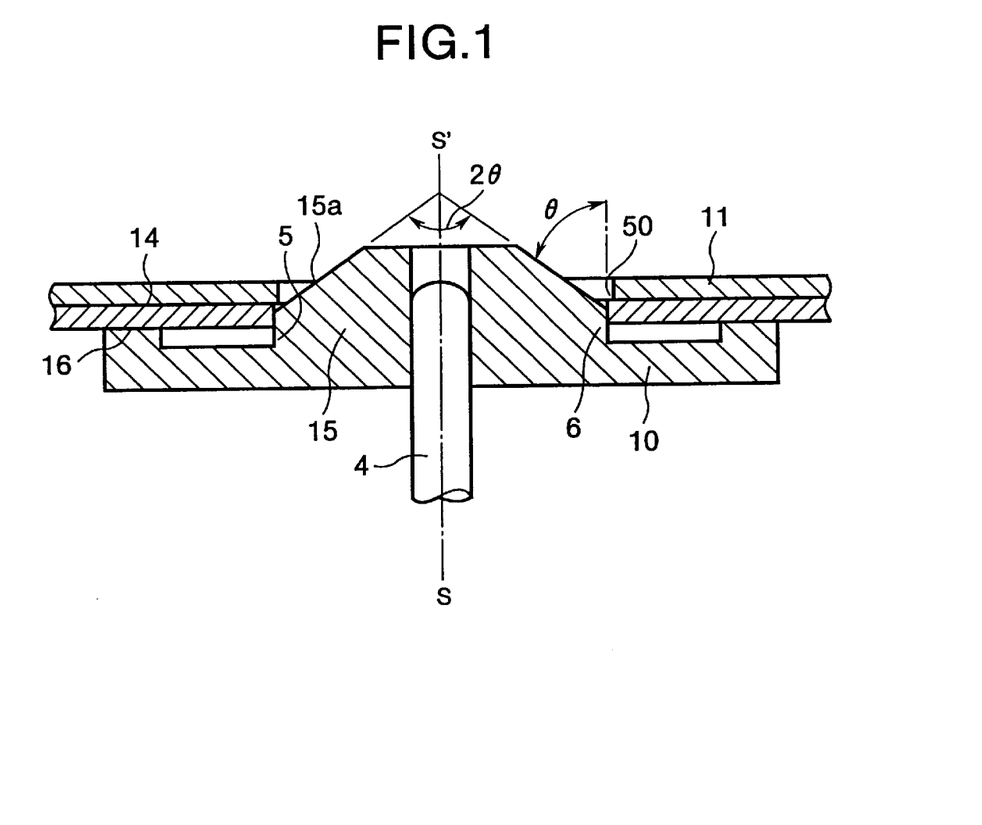
FIG. 1 is a cross-sectional view of a turntable according to a first embodiment when a laminated disc is loaded thereon.

FIG. 1 is a cross-sectional view of a turntable 10 according to a first embodiment, showing the turntable 10 when a laminated disc 11 is loaded thereon.

Referring to FIG. 1, a positioning hub 5 fits into a center hole 6 in the disc 11 with a very small clearance, for example, several microns, accurately positioning the disc with respect to the rotational axis S–S' of the motor shaft 4. The disc 11 is supported on the turntable 10. A motor shaft 4 of a spindle motor, not shown, is press-fitted into or securely bonded to a truncated cone 15 of the turntable 10 in a similar manner to the prior art turntable shown in FIG. 20. The spindle motor drives the turntable 10 in rotation via the motor shaft 4.

The laminated disc 10 includes two discs placed together, slightly eccentric due to alignment error within a predetermined tolerance. The relative eccentricity of the center holes of the two discs results in a small step 50 in the wall of the center hole 6 of the laminated disc 1. The positioning hub 5 is integrally continuous with the cone 15 having an inclined surface 15a. The inclined surface 15a makes an angle θ with the axis S–S' so that the inclined surface 15a will not interfere with the stepped edge of the wall of the center hole 6.

Figure 2:
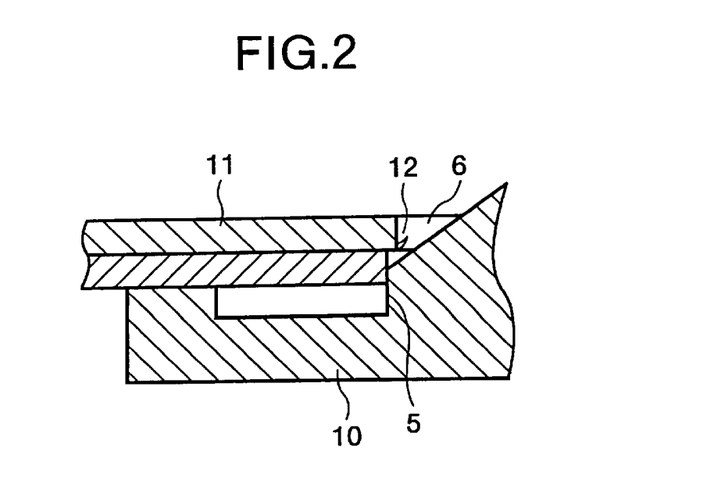
FIG. 2 is a fragmentary cross-sectional view of the turntable and a disc loaded on the turntable, the disc having a burn.
Figure 3:
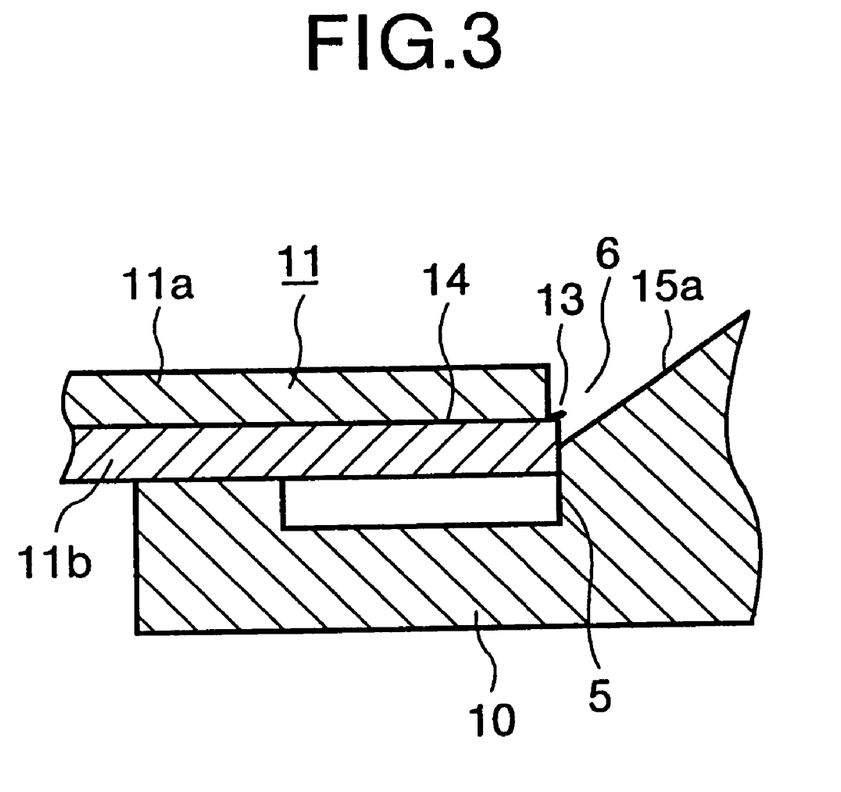
FIG. 3 is a fragmentary cross-sectional view of the turntable and a disc with a bonding agent spreading out of an interface between the two discs.

FIG. 2 is a fragmentary cross-sectional view of a disc 11 which has a burr 12 and is loaded on the turntable 10. FIG. 3 is a fragmentary cross-sectional view of the turntable 10 and the disc 11 when a bonding agent 13 spreads out of an interface 14 between the two discs.

Figure 4:
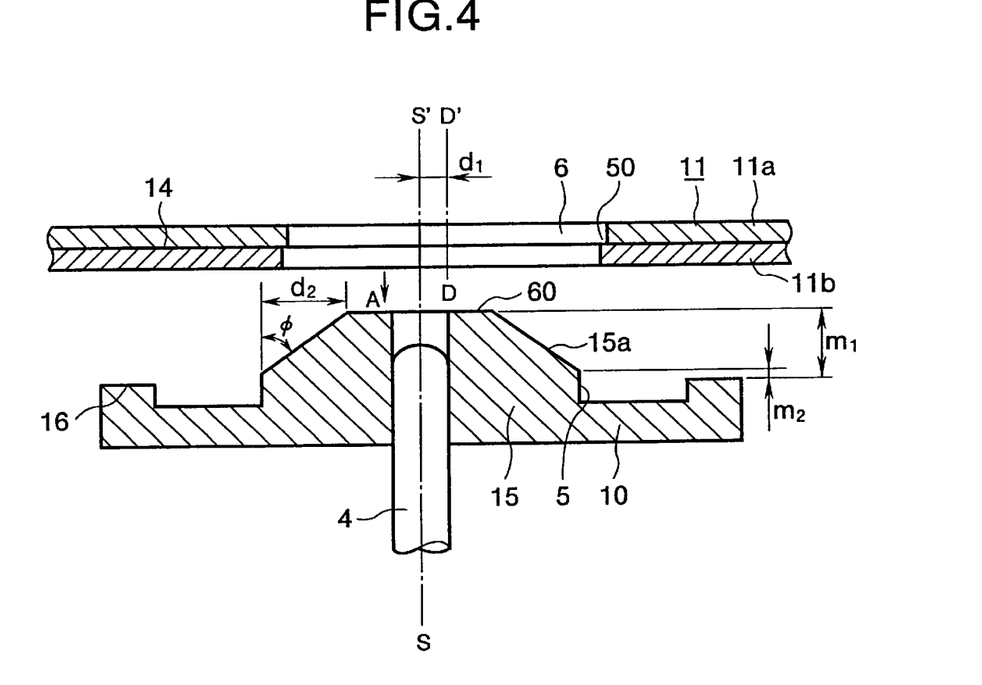
FIG. 4 illustrates the positional relation between the disc and the turntable.

The truncated cone 15 will now be described in more detail with reference to FIGS. 4–7. FIG. 4 illustrates the positional relation between the disc 11 and the turntable 10.

The disc 11 is assumed to have been held above the turntable 10 with its center line D–D' offset a distance d1 from the axis S–S' of the motor shaft 4. Then, the disc 11 is lowered in a direction shown by arrow A, thereby being loaded onto the inclined surface 15a of the turntable 10. The surface 15a of the truncated cone 15 makes an angle of θ with the shaft 4 as shown in FIG. 1. In order that the disc 11 is comfortably loaded onto the turntable 10 without deformation, the disc 11 must first be placed on the inclined surface 15a of the truncated cone 15. This condition is achieved by the following relation.

$$d2 > d1 \quad (1)$$

where d2 is a dimension of the truncated cone parallel to the disc 11.

The dimension d2 may be expressed as follows:

$$d2 = (m1 - m2) \tan \theta \quad (2)$$

where m1 is the distance between the disc supporting surface 16 of the turntable 11 and the top flat surface 60 of the truncated cone 15, and m2 is the distance between the supporting surface 16 and the upper end of the positioning hub 5.

From Equations (1) and (2), the following relation is derived.

$$\tan \theta \geq d1/(m1-m2) \quad (3)$$

In other words, in order to ensure that d2>d1, it is necessary that the lower limit of the angle θ must satisfy Equation (3).

The distance m1 is selected to be about 2.5 mm since the turntable 11 is usually of thin construction. The distance m2 between the full thickness of the lower disc and the half the full thickness since the disc 11 is placed in position by having the center hole of the lower disc 11b engage the positioning hub 5. A DVD has a thickness of 0.6 mm, and therefore the distance m2 is selected to be 0.3 mm which is a half of the thickness of the lower disc. When manufacturing a DVD, the upper and lower discs are placed together in such a way that the outer diameter of one disc is registered with that of the other. Therefore, the offset d1 of about 0.5 mm usually results from the eccentricity of the outer diameter with respect to the center hole and the dimensional errors of the outer diameters of the upper and lower discs. Consequently, the angle θ greater than 13° is obtained by putting m1=0.5 mm, m2=0.3 mm, and d1=0.5 mm into Equation (3).

Figure 5:
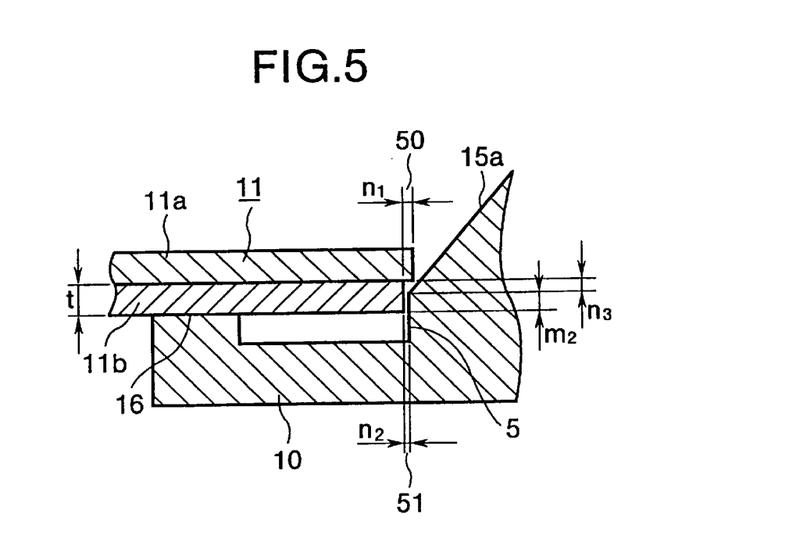
FIG. 5 is a fragmentary side view of the turntable and the disc loaded to the turntable.

FIG. 5 is a fragmentary side view of the turntable 10 and the disc 11 loaded to the turntable 10. The disc 11 has a step 50. There is a small clearance 51 between the lower disc 11b and the positioning hub 5. In order that the disc 11 smoothly fits to the turntable 10 without the truncated cone 15 interfering with the step 50, the lower limit of the angle θ must be determined by the following relation.

$$\tan \theta \geq \{(n1-n2)/n3\} \quad (4)$$

where n1 is the size of the step 50, n2 is the size of the clearance 51, and n3 is the difference between the thickness t and the distance m2. The step 50 or n1 is usually less than 0.1 mm and therefore the distance m2 longer than the half of the thickness t is enough. For DVDs, m2 is 0.3 mm and thickness t is 0.6 mm. The clearance 51 is usually several tens microns and is assumed to be 30 microns in this embodiment. By putting m2=0.3 mm, n1=0.1 mm, n2=30 μm, and t=0.3 mm into Equation (4), the angle θ greater than 13° is obtained.

Figure 6:
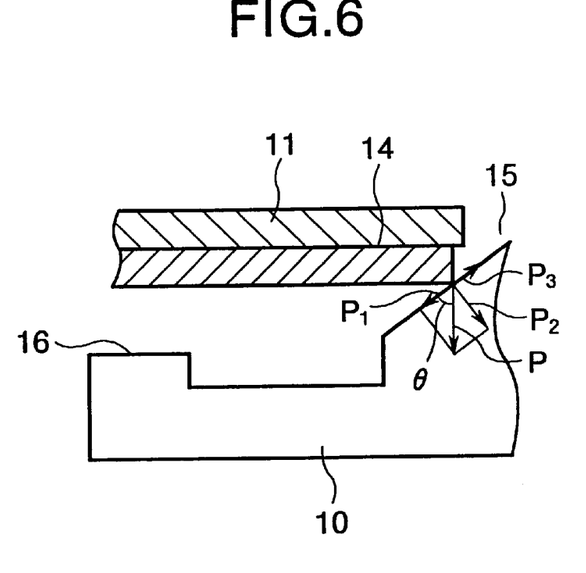
FIG. 6 illustrates the the disc smoothly guided along the inclined surface of the truncated cone.

FIG. 6 illustrates the the disc 11 smoothly guided along the inclined surface 15a of the truncated cone 15. The total weight P of the disc 11 is a force acting downwardly. The weight P is resolved into a component P2 normal to the inclined surface 15a and a component P1 acting downward along the inclined surface 15a. In order for the disc 11 to smoothly slide along the inclined surface 15a of the truncated cone 15, the following relation must be satisfied.

$$P1 > P3 \quad (5)$$

where P3 is a friction acting in a direction opposite to the component P1.

The angle θ is determined by putting $P1=P \cos \theta$, $P2=P \sin \theta$, and $P3=\mu P2=\mu P \sin \theta$ into Equation (5).

$$\tan \theta < 1/\mu \quad (6)$$

where $\mu$ is a coefficient of friction between the disc 11 and the inclined surface 15a of the truncated cone 15.

Optical discs are usually made of thermoplastic plastics and turntables are made of materials such as thermoplastic plastics or metal. With discs and turntables made of such materials, the coefficient of friction $\mu$ is in the range of 0.2–0.5 and is the largest when both the disc and turntable are made of plastics. For $\mu=0.5$, the angle θ is less than 63.5° from Equation (6).

Therefore, the angle θ of the truncated cone 15 should be in the range from 13 to 63.5 degrees, and preferably in the range of 15–60 degrees.

The aforementioned construction offers the same advantages for discs having the burr 12 or the sag 13 of an adhesive on the wall of the center hole of the disc.

Figure 7:
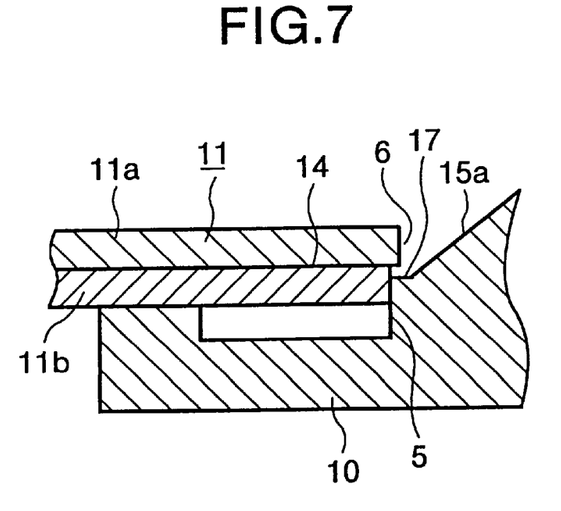
FIG. 7 illustrates the positioning hub of the turntable having a horizontal surface formed parallel to the disc surface placed on the turntable.

In the aforementioned embodiment, the angle θ of the surface of the truncated cone 15 is selected such that the wall defining the center hole 6 of the disc will 11 not touch the inclined surface 15a of the truncated cone 15 if the upper and lower discs of the disc 11 are eccentric with each other within a predetermined tolerance. As shown in FIG. 7, the turntable 10 may be formed with a horizontal surface 17 parallel to the disc surface placed on the turntable 10 so that the truncated cone is continuous with the positioning hub 5 via the horizontal surface 17. The horizontal surface 17 has a radial distance less than about several hundred microns.

Second Embodiment

Figure 8:
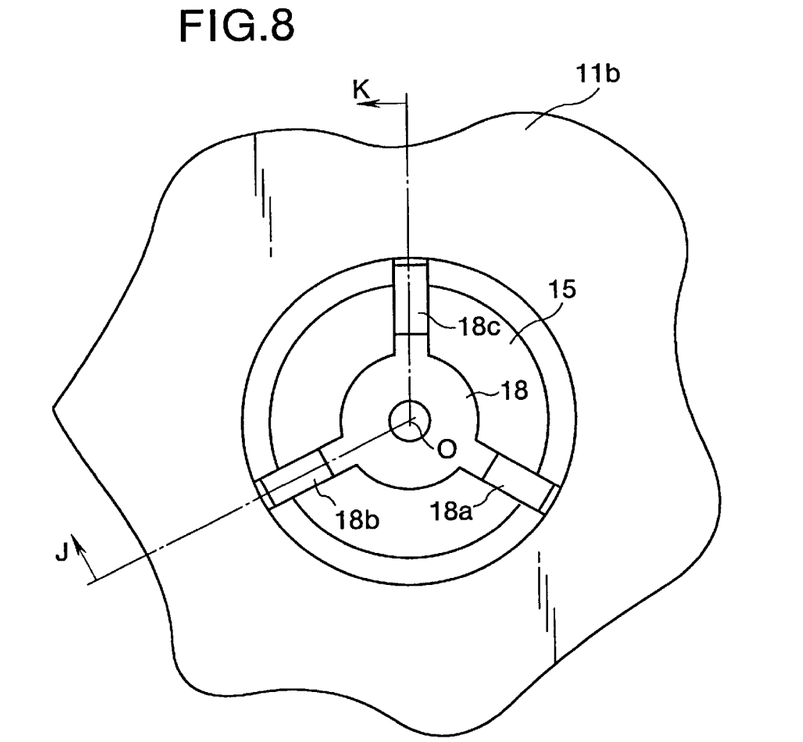
FIG. 8 is a top view of the disc and turntable according to a second embodiment.
Figure 9:
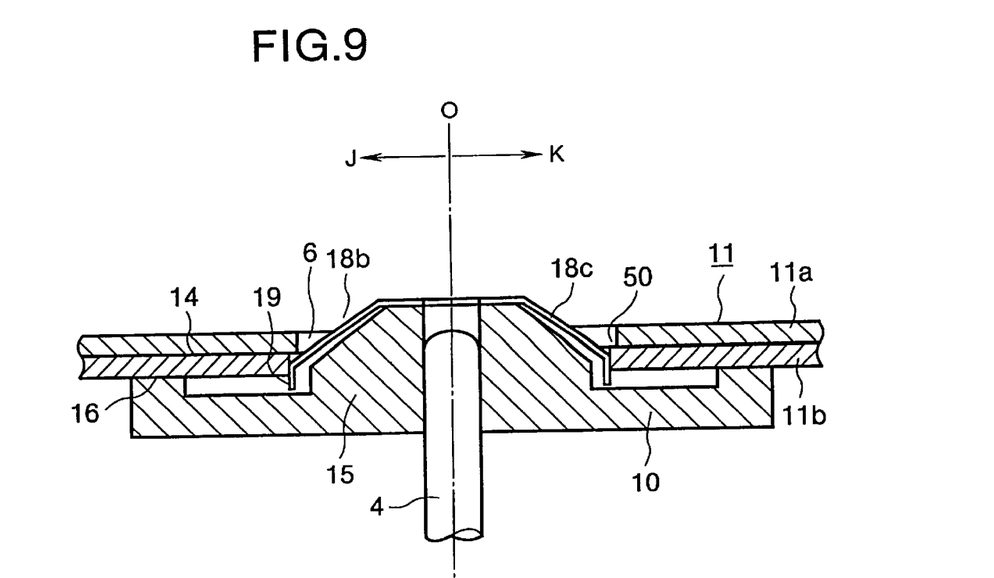
FIG. 9 is a cross-sectional view taken along lines J–O and O–K of FIG. 8.

FIG. 8 is a top view of the disc 11 and turntable 10 according to a second embodiment and FIG. 9 is a cross-sectional view taken along lines J–O and O–K of FIG. 8. Referring to FIGS. 8 and 9, a spring 18 has three spring legs 18a–18b angularly 120° spaced apart and extending outwardly and downwardly. The spring leg has an abutting surface 19 at its free end. The abutting surface 19 is a vertically extending surface. It is to be noted that the abutting surface 19 abuts the circumferential wall of the center hole 6 of the lower disc 11b with a predetermined urging force. This construction is advantageous in that the step 50 or the burr 12 such as shown in FIG. 2 will not touch any part of the turntable 10 and the disc 11 can be positioned in place with no clearance between the abutting surface 19 and the wall defining center hole 6.

Figure 10:
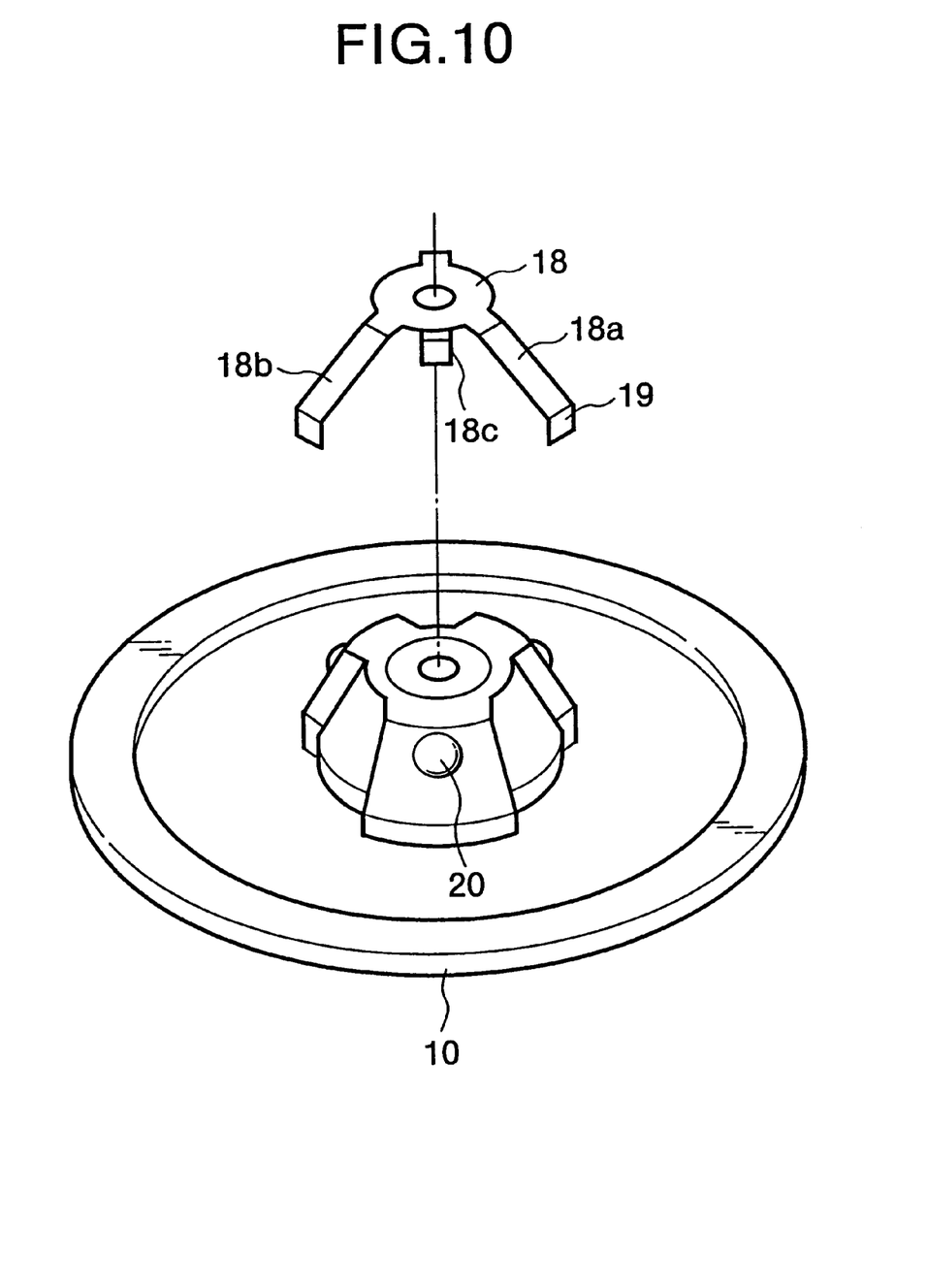
FIG. 10 is an exploded perspective view when the turntable is provided with a ball-chucking construction.
Figure 11:
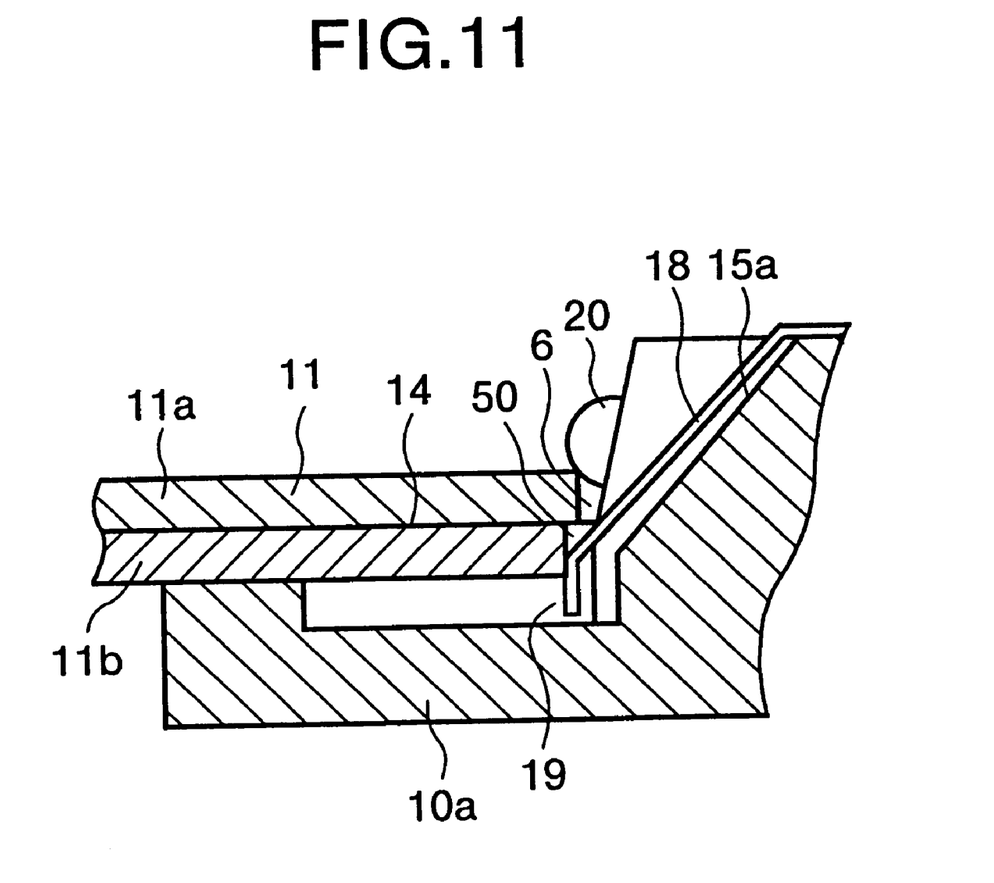
FIG. 11 is a cross-sectional view when the disc is loaded onto the chucking type turntable.

FIG. 10 is an exploded perspective view of a chucking type turntable 10a which is provided with a ball-chucking construction. The spring 18 in FIGS. 8–9 is also used in the construction. The chucking construction includes chucking balls 20. FIG. 11 is a cross-sectional view when the disc 11 is loaded onto the chucking type turntable 10a. As is clear from FIGS. 9 and 10, the step 50 in the wall of the center hole 6 of the disc 11 still will not touch the turntable 10a of the chucking construction.

Third Embodiment

Figure 12:
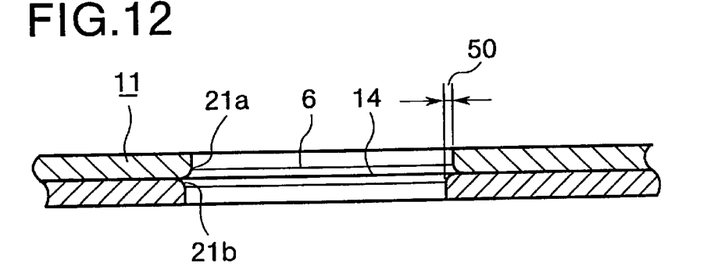
FIG. 12 is a fragmentary cross-sectional side view of a laminated disc according to a third embodiment.

FIG. 12 is a cross-sectional view of a laminated disc 11 according to a third embodiment. The upper and lower discs 11a and 11b are beveled at their edges 21 defining the center hole 6, and are placed together so that the beveled edges directly face each other.

Figure 13:
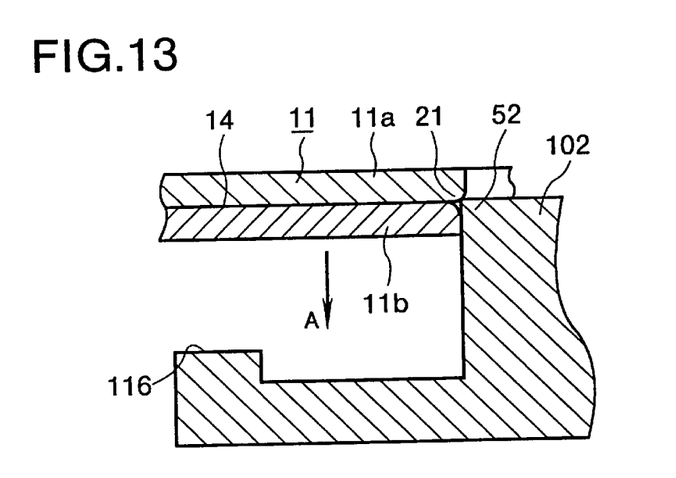
FIG. 13 is a cross-sectional view of the laminated disc when it is loaded to a supporting surface of a conventional turntable.

FIG. 13 is a cross-sectional view of the laminated disc 11 when it is loaded to a supporting surface 116 of a conventional turntable 102. With the aid of the beveled edges, the turntable 102 can fit into the center hole 6 of the laminated disc 11 without the head corner 52 of the turntable 102 caught by the step 50.

The laminated disc 11 is usually made of plastics by molding and has a thickness larger than 0.5 mm. This thickness is a reasonable thickness that can be achieved with a sufficient dimensional accuracy by molding. Accordingly, the upper and lower discs need to be beveled by a width less than 0.5 mm. For example, the corners of the edges are rounded or radiused by less than R=0.5.

Figure 14:
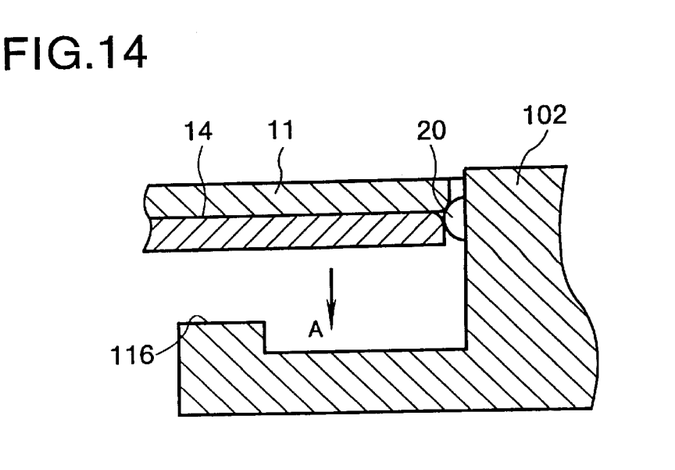
FIG. 14 is a cross-sectional view of the laminated disc of the third embodiment when it is loaded onto the conventional ball chucking type turntable having a metal chucking ball.

FIG. 14 is a cross-sectional view of the laminated disc 11 of the third embodiment when it is loaded onto the conventional ball chucking type turntable 102 having a metal chucking ball 20. The beveled edge facilitates the smooth passage of the disc 11 over the ball 20 along the turntable 102. The disc 11 can be loaded onto the disc supporting surface 116 of the turntable 102 without being caught by the ball 20.

Fourth Embodiment

Figure 15:
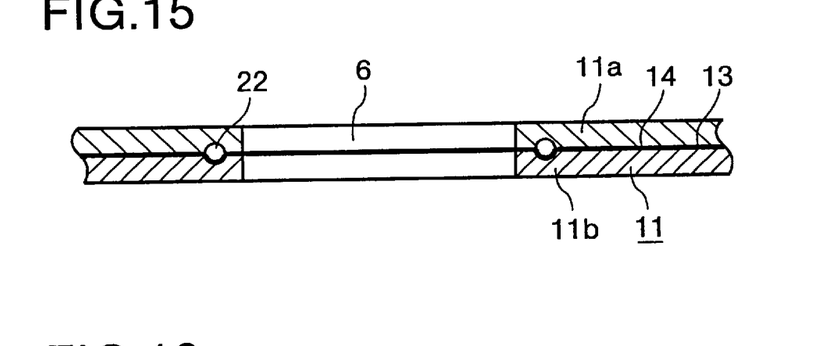
FIG. 15 is a cross-sectional view of a disc according to a fourth embodiment.

FIG. 15 is a cross-sectional view of a disc 11 according to a fourth embodiment. The upper and lower discs 11a and 11b are formed with annular grooves 22a and 22b, respectively, in the bonding surface 14 thereof. The grooves 22a and 22b have a cross section of a semicircle and are close to and concentric with the center hole 6. The upper and lower discs 11a and 11b are placed together so that the grooves 22a and 22b define a toroidal space that acts as a reservoir 22 for holding a bonding agent therein.

Figure 16:
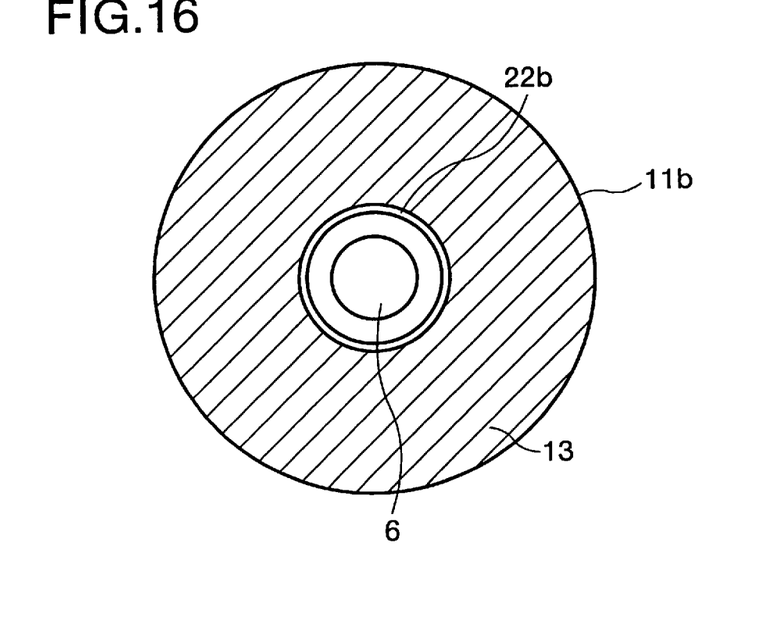
FIG. 16 is a top view of the lower disc.

FIG. 16 is a top view of the lower disc 11b. The bonding agent 13 is applied to the bonding surface 14 as depicted by hatched portion except an area inner than the annular groove 22b.

When the upper and lower discs 11a and 11b are placed together after applying the bonding agent 13, excessive bonding agent 13 spreads into the reservoir 22, being prevented from further spreading toward the center hole 6.

The reservoir 22 also serves to prevent the bonding agent 13 from spreading toward the center hole 6 when the laminated disc 11 is placed in an environment of elevated temperatures.

Figure 17:
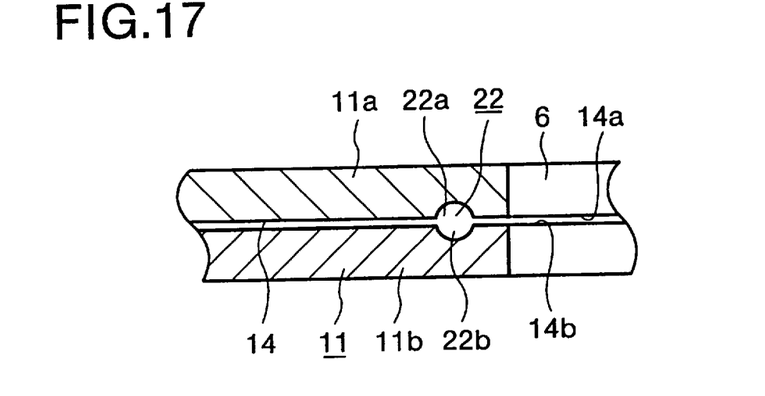
FIG. 17 is a cross-sectional view of another laminated disc.

FIG. 17 is a cross-sectional view of another laminated disc 11. The upper and lower discs 11a and 11b are formed with annular, shallow steps 14a and 14b, respectively, in an area closer to the center hole 6 than the annular groove 22a and 22b. When the upper and lower discs are placed together, the steps 14a and 14b define a space that communicates with the reservoir 22 to accommodate the bonding agent spreading out of the reservoir 22 toward the center hole 6.

Figure 18:
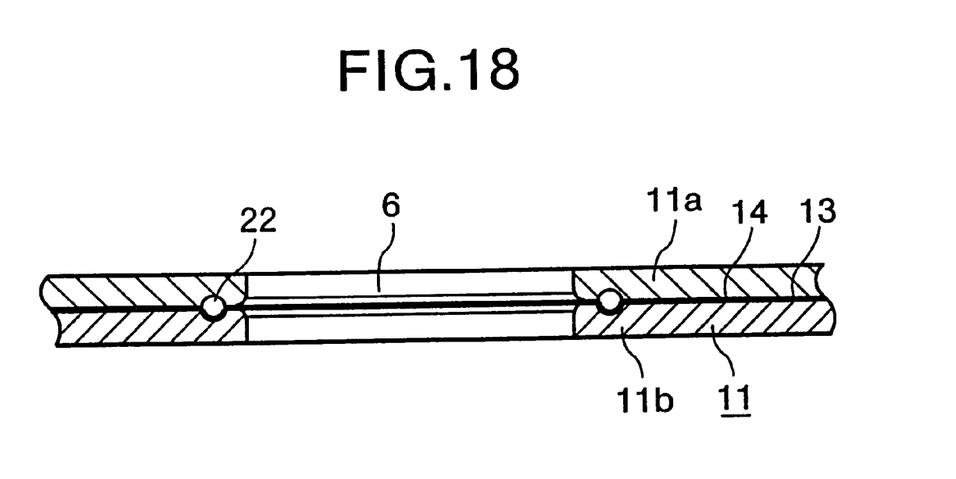
FIG. 18 is a fragmentary cross-sectional view of a laminated disc with a beveled corner of the center hole and an annular grooved therein.
Figure 19:
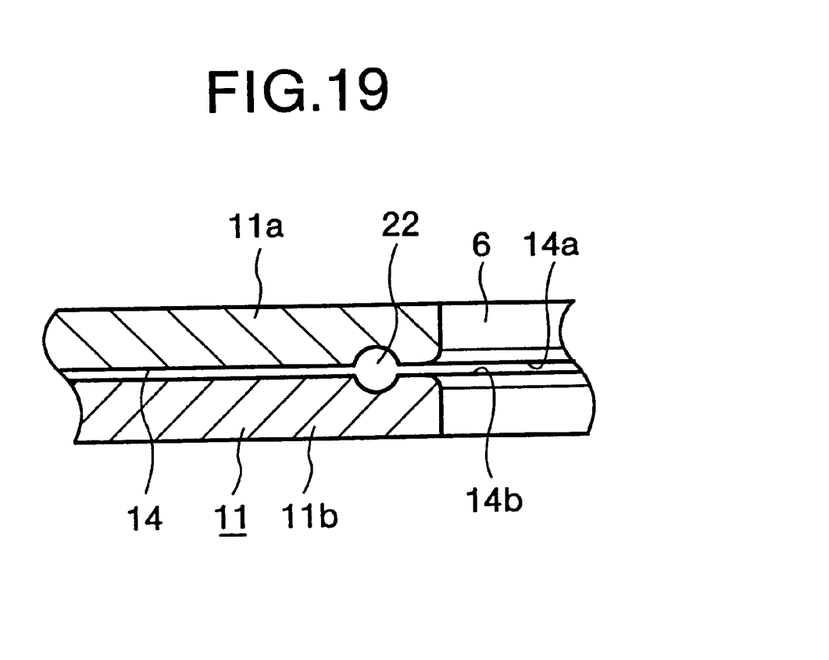
FIG. 19 is a fragmentary cross-sectional view of a laminated disc having a recess closer to the center hole than the groove of FIG. 18.

The laminated disc may have both a beveled corner of the center hole and an annular groove therein as shown in FIG. 18. The laminated disc shown in FIG. 18 may further be formed with a shallow recess, as shown in FIG. 19, closer to the center hole than the groove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laminated disc having a center hole, comprising:

a lower disc having an edge which defines the center hole, said lower disc having a generally planar inner surface with an edge cut away at its corner along a circumference of the center hole for holding a bonding agent therein; and an upper disc bonded on said lower disc, said upper disc having an edge which defines the center hole, said upper disc having a generally planar inner surface with an edge cut away at its corner along a circumference on the center hole for holding a bonding agent therein;

wherein said lower disc and upper disc are placed together with the generally planar inner surfaces and their cut away corners facing each other.

2. The laminated disc according to claim 1, wherein said upper and lower discs have annular grooves formed in the planar inner surfaces, said annular grooves having a cross section of a semicircle and defining a toroidal space between said lower and upper discs.

3. The laminated disc according to claim 2, wherein said laminated disc has a gap defined between said upper and lower discs, the gap being closer to the center hole than the toroidal space, said gap communicating with the toroidal space and holding an excess amount of bonding agent therein.

4. The laminated disc according to claim 2, wherein said upper and lower discs have the bonding agent except an area closer to the center hole than said annular grooves.

5. The laminated disc of claim 1 wherein said cut away corner is beveled.

6. The laminated disc of claim 1 wherein said cut away corner is rounded.

7. A laminated disc having a center hole, comprising:

a lower disc having an edge which defines the center hole, said lower disc having a surface with the edge cut away at its corner along a circumference of the center hole for allowing the laminated disc to pass over a turntable, the surface having a first groove formed therein in the vicinity of the center hole for holding a bonding agent therein; and an upper disc bonded on said lower disc, said upper disc having an edge which defines the center hole, said upper disc having a surface with the edge cut away at its corner along a circumference of the center hole for allowing the laminated disc to pass over a turntable, the surface having a second groove formed in the vicinity of the center hole for holding the bonding agent therein; and wherein said lower and upper disc are placed together with the surfaces having the first and second grooves formed therein and their cut away corners facing each other.

8. The laminated disc according to claim 7, wherein said first and second grooves are annular grooves having a cross section of substantially a semicircle, said annular grooves defining a toroidal space between said lower and upper disc.

* * * * *